US009235388B2

(12) United States Patent
Kannan

(10) Patent No.: US 9,235,388 B2
(45) Date of Patent: Jan. 12, 2016

(54) MULTI-DIMENSIONAL, MULTI-CONFIGURATION COMPILATION PHASE OUTPUT VISUALIZATION TECHNIQUE

(71) Applicant: Red Hat, Inc., Raleigh, NC (US)

(72) Inventor: Shakthi Kannan, Magarpatta (IN)

(73) Assignee: Red Hat, Inc., Raleigh, NC (US)

( * ) Notice: Subject to any disclaimer, the term of this patent is extended or adjusted under 35 U.S.C. 154(b) by 150 days.

(21) Appl. No.: 14/180,296

(22) Filed: Feb. 13, 2014

(65) Prior Publication Data

US 2015/0227350 A1 Aug. 13, 2015

(51) Int. Cl.
| | |
|---|---|
| G06F 19/00 | (2011.01) |
| G06F 9/455 | (2006.01) |
| G06F 13/12 | (2006.01) |
| G06F 13/38 | (2006.01) |
| G06F 15/00 | (2006.01) |
| G06F 3/00 | (2006.01) |
| G06F 15/04 | (2006.01) |
| G06F 17/50 | (2006.01) |
| G06F 9/44 | (2006.01) |
| G06F 9/45 | (2006.01) |
| G06F 9/46 | (2006.01) |

(Continued)

(52) U.S. Cl.
CPC ................ *G06F 8/41* (2013.01); *G06F 3/0482* (2013.01); *G06F 3/04842* (2013.01); *G06F 3/04847* (2013.01)

(58) Field of Classification Search
CPC ....... G06F 11/3604; G06F 21/16; G06F 8/71; G06F 8/34; G06F 8/20; G06F 8/314; G06F 9/45504; G06F 4/45516; G06F 17/5022; G06F 19/3493; G06F 19/366
See application file for complete search history.

(56) References Cited

U.S. PATENT DOCUMENTS 5,694,578 A * 12/1997 Upson et al. ..................... 710/73
5,933,353 A * 8/1999 Abriam et al. ................ 700/182
6,052,515 A * 4/2000 Bruckhaus .................... 716/139

(Continued)

OTHER PUBLICATIONS

Volker Grimm, Visual Debugging: A Way of Analyzing, Understanding and Communicating Bottom-Up Simulation Models in Ecology, Natural Resource Modeling, retrieved Feb. 13, 2014 from http://onlinelibrary.wiley.com/doi/10.1111/j.1939-7445.2002.tb00078.x/abstract, pp. 23-38, vol. 15, Issue 1, Mar. 2002.

(Continued)

*Primary Examiner* — Don Wong
*Assistant Examiner* — Anibal Rivera
(74) *Attorney, Agent, or Firm* — Haynes and Boone, LLP

(57) ABSTRACT

Systems and methods of providing a visual output of a compilation phase is provided. An example method includes receiving input source code for compilation by a compiler and displaying a multi-dimensional coordinate system including first and second axes. The method also includes providing a first user interface object associated with the first axis and providing a second user interface object associated with the second axis. The first user interface object enables a user to select one or more compilation phases, and the second user interface object enables the user to select one or more compiler versions. The method further includes receiving via the first user interface object a user selection of a compilation phase and obtaining an output of the input source code compiled in accordance with the selected compilation phase. The method further includes displaying the output between two axes of the multi-dimensional coordinate system.

20 Claims, 6 Drawing Sheets

(51) Int. Cl.
*G06F 3/0484* (2013.01)
*G06F 3/0482* (2013.01)

(56) References Cited

U.S. PATENT DOCUMENTS

| | | | | |
|---|---|---|---|---|
| 7,302,675 | B2 | 11/2007 | Rogers et al. | |
| 8,060,870 | B2 | 11/2011 | Eichenberger et al. | |
| 8,229,735 | B2 | 7/2012 | Robertson et al. | |
| 8,554,535 | B2 * | 10/2013 | Nohl et al. | 703/26 |
| 8,578,282 | B2 * | 11/2013 | Boillot | 715/762 |
| 8,701,084 | B1 * | 4/2014 | MacDonald | 717/113 |
| 2003/0217248 | A1 * | 11/2003 | Nohl et al. | 712/208 |
| 2005/0097561 | A1 * | 5/2005 | Schumacher et al. | 718/106 |
| 2008/0115120 | A1 * | 5/2008 | Clifton et al. | 717/153 |
| 2011/0161912 | A1 * | 6/2011 | Eteminan et al. | 717/101 |
| 2012/0159444 | A1 | 6/2012 | Agarwal et al. | |

OTHER PUBLICATIONS

Christian Tominski, et al., Interactive Poster: 3D Axes-Based Visualizations for Time Series Data, retrieved on Feb. 13, 2014 from http:///citeseerx.ist.psu.edu/viewdoc/download?doi=10.1.1.113. 5175&rep=rep1&type=pdf, two pages.

Mariko Sasakura et al., NaraView: An Interactive 3D Visualization System for Parallelization of Programs, International Journal of Parallel Programming, retrieved on Feb. 13, 2014 from http://link. springer.com/article/10.1023/A:1018792319452, 35 pages, vol. 27, No. 2, 1999.

Walter R. Bischofberger, Sniff: A Pragmatic Approach to a C++ Programming Environment, (Abstract), OOPSLA'92, retrieved on Feb. 13, 2014 from http://dl.acm.org/citation.cfm?id=157795; 1 page,, Vancouver, British Columbia, Canada.

* cited by examiner

MULTI-DIMENSIONAL, MULTI-CONFIGURATION COMPILATION PHASE OUTPUT VISUALIZATION TECHNIQUE

BACKGROUND

The present disclosure generally relates to compilers, and more particularly to providing a visual output associated with a compilation process.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. The compiler may be used to develop the source code and ensure that it executes properly.

A compiler translates an input program written in a programming language into an equivalent program in another language. In particular, the compiler takes a program written in a high-level programming language as input and translates the program into an equivalent program in a low-level language such as machine language or assembly language. The program written in the high-level language may be referred to as the source program, and the program converted into the low-level language may be referred to as the object (or target) program. After compilation of the source program, the target program may be loaded into memory for execution. The compilation process has many phases and debugging a compiler may be time consuming.

BRIEF SUMMARY

This disclosure relates to providing a visual output of one or more compilation phases. Methods, systems, and techniques for providing a visual output of one or more compilation phases are provided.

According to an embodiment, a system for providing a visual output of one or more compilation phases includes a first input/output (I/O) interface that receives input source code for compilation by a compiler. The compilation of the input source code includes a plurality of compilation phases. The system also includes a second I/O interface that obtains a first output of the input source code compiled in accordance with a user selected first compilation phase. The system further includes a user interface that receives via a first user interface object the user selection of the first compilation phase. The system also includes a coordinate system display engine that displays a multi-dimensional coordinate system including a first axis that represents compilation phases and a second axis that represents versions of the compiler. The coordinate system display engine displays the first output between two axes of the multi-dimensional coordinate system. The system further includes an object display engine that displays the first user interface object associated with the first axis and displays a second user interface object associated with the second axis. The first user interface object enables a user to select one or more compilation phases. The second user interface object enables the user to select one or more compiler versions.

According to another embodiment, a method of providing a visual output of one or more compilation phases includes receiving input source code for compilation by a compiler. The compilation of the input source code includes a plurality of compilation phases. The method also includes displaying a multi-dimensional coordinate system including first and second axes. The first axis represents compilation phases. The second axis represents versions of the compiler. The method further includes providing a first user interface object associated with the first axis. The first user interface object enables a user to select one or more compilation phases. The method also includes providing a second user interface object associated with the second axis. The second user interface object enables the user to select one or more compiler versions. The method further includes receiving via the first user interface object a user selection of a first compilation phase. The method also includes obtaining a first output of the input source code compiled in accordance with the selected first compilation phase. The method further includes displaying the first output between two axes of the multi-dimensional coordinate system.

According to another embodiment, a non-transitory machine-readable medium includes a plurality of machine-readable instructions that when executed by one or more processors are adapted to cause the one or more processors to perform a method including: receiving input source code for compilation by a compiler, the compilation of the input source code including a plurality of compilation phases; displaying a multi-dimensional coordinate system including first and second axes, wherein the first axis represents compilation phases and the second axis represents versions of the compiler; providing a first user interface object associated with the first axis, wherein the first user interface object enables a user to select one or more compilation phases; providing a second user interface object associated with the second axis, wherein the second user interface object enables the user to select one or more compiler versions; receiving via the first user interface object a user selection of a first compilation phase; obtaining a first output of the input source code compiled in accordance with the selected first compilation phase; and displaying the first output between two axes of the multi-dimensional coordinate system.

BRIEF DESCRIPTION OF THE DRAWINGS

The accompanying drawings, which form a part of the specification, illustrate embodiments of the invention and together with the description, further serve to explain the principles of the embodiments. It should be appreciated that like reference numerals may be used to identify like elements or similarly functioning elements illustrated in one or more of the figures. The drawing in which an element first appears is generally indicated by the left-most digit in the corresponding reference number.

DETAILED DESCRIPTION

I. Overview

II. Example System Architecture

Figure 1:
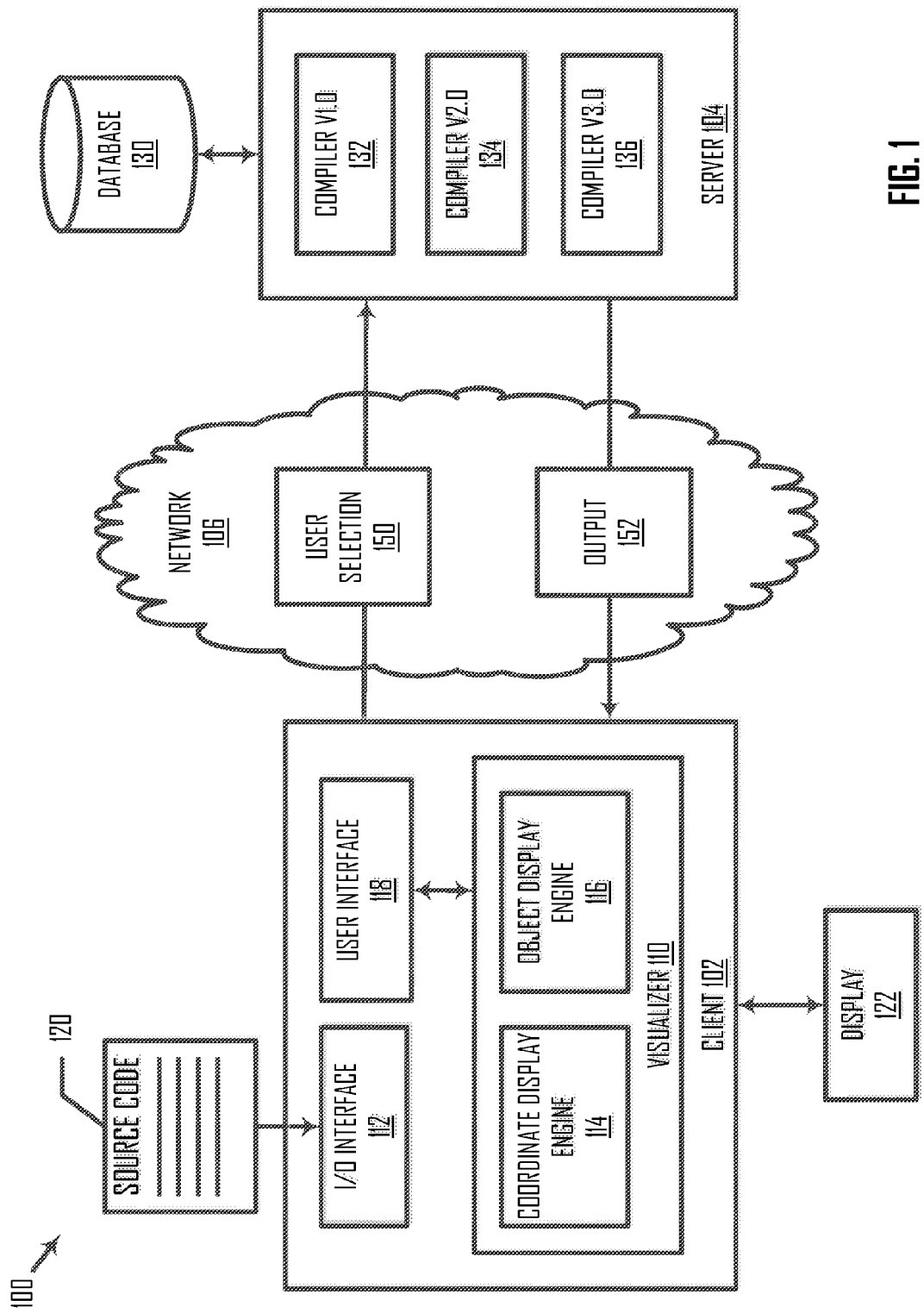
FIG. 1 is a simplified block diagram illustrating a system for providing a visual output of one or more compilation phases, according to an embodiment.

III. Optimizations
   A. Scaling Out to the Cloud
   B. Cache Data Associated with Compilation Process
IV. Example Method
V. Example Computing System I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

A compiler may be used to compile a program including source code into object code. The source code may be written in a high-level programming language and represented as a text file or a logically related group of text files. Object code may refer to native machine code that is executable on a hardware platform (e.g., x86). Compilation of the input source code may include a plurality of compilation phases. In an example, the successive compilation phases may include lexical analysis, parsing (or syntax analysis), semantic (or context-dependent or type-dependent) analysis, intermediate code generation, code optimization, and code generation. The compilation phases associated with different compilers may be different. Each phase takes, as the input, the result of the previous phase and passes its output to the next phase.

A compiler may be complicated technology, and developers may not understand the effect the compiler has on the program. For example, the compiler may exploit hardware enhancements by determining capabilities of new chip designs and transform an application into highly-tuned machine code that optimally performs on the new hardware. Further, the compiler may optimize the program. For example, the compiler may transform an application into a significantly more efficient version of itself by recognizing inefficient programming practices and converting them into more efficient ones. Additionally, a compiler may generate code for different hardware architectures (e.g., ARM devices). Developers may not understand the low-level details of the hardware to code an efficient program.

Compilers are typically backend tools. It may be desirable to provide a frontend tool that is able to connect to the backend system and be able to help a user to effectively visualize the compilation process. For example, compiler developers and software developers may be interested in how their source code is transformed through the various compilation phases. In an example, it may be desirable to provide a visualization technique to compiler developers and/or software developers so they can better understand code transformations. With this knowledge, software developers may write better programs with an understanding of programming language grammar, compiler capabilities, hardware support, and visualization. Additionally, compiler developers may be better able to debug their compilers and write more efficient compilers by being able to see how their code changes affect input source code given to the compiler. The disclosure provides assistance to users interested in understanding the compilation process or code transformations between compilation phases.

In an embodiment, a system for providing a visual output of one or more compilation phases includes a first input/output (I/O) interface that receives input source code for compilation by a compiler. The compilation of the input source code includes a plurality of compilation phases. The system also includes a second I/O interface that obtains a first output of the input source code compiled in accordance with a user selected first compilation phase. The system further includes a user interface that receives via a first user interface object the user selection of the first compilation phase. The system also includes a coordinate system display engine that displays a multi-dimensional coordinate system including a first axis that represents compilation phases and a second axis that represents versions of the compiler. The coordinate system display engine displays the first output between two axes of the multi-dimensional coordinate system. The system further includes an object display engine that displays the first user interface object associated with the first axis and displays a second user interface object associated with the second axis. The first user interface object enables a user to select one or more compilation phases. The second user interface object enables the user to select one or more compiler versions.

II. Example System Architecture

FIG. 1 is a simplified block diagram 100 illustrating a system for providing a visual output of one or more compilation phases, according to an embodiment. Diagram 100 includes a client 102 and a server 104 coupled to a network 106. Client 102 and server 104 may communicate with each other via network 106. For example, client 102 may send requests to and receive responses from server 104 over network 106. Network 106 may include various configurations including the Internet, World Wide Web, intranets, virtual private networks, wide area networks, local networks, private networks using communication protocols such as protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

Client 102 includes a visualizer 110, I/O interface 112, and user interface 118. Visualizer 110 provides a visual output of one or more compilation phases in accordance with a user's input. In an embodiment, I/O interface 112 receives input source code 120 in a high-level programming language. Examples of high-level programming languages are the C, C++, COBOL (Common Business Oriented Language), and Java programming languages.

An example of source code 120 is provided in Table A below.

TABLE A

```
int
main ( )
{
  int a;
  int b;
  int c;
  a = 5;
  b = 10;
  c = 0;
  c = a * b;
  return 0;
}
```

Source code 120 may be stored in text files called source code files. In an example, the source code in Table A is stored in a file "test.c." To generate different compilation phase output files for "test.c" using a GNU (GNU's Not Unix) compiler collection (GCC) compiler, a user may type in the command line "$ gcc -fdump-tree-all test.c", which creates a number of test.c.* files.

Client 102 may receive source code 120 over network 106 or retrieve source code 120 from a local storage device. Source code 120 is human-readable code that is eventually converted into something that a computer processor can understand to control input and output devices and/or to perform calculations. In an example, source code 120 may be converted into machine language, which includes logical ones and zeros that present basic instructions for one or more central processing units (CPUs) and is executed by the one or more CPUs. A compiler translates source code 120 into binary code that can be directly executed on a CPU. In an example, the compiler produces "native code" that is executed by the CPU. Although the description describes the machine instructions as executing on a CPU, it should also be understood that the machine instructions may execute on a graphic processing unit (GPU). In such an example, the compiler that produces the machine instructions on which the GPU is to be executed is specific to the GPU.

Source code 120 may be transformed into different forms before eventually being transformed into machine language. For example, the compilation of source code 120 includes a plurality of compilation phases that may include lexical analysis, parsing (or syntax analysis), semantic (or context-dependent or type-dependent) analysis, intermediate code generation, code optimization, and code generation. An output of the lexical analysis phase may be a stream of tokens. An output of the parsing phase may be a tree representation of the source code. An output of the semantic analysis may be warnings or errors if the semantic checks fail. An output of the intermediate code generation phase may be a representation of the code in an intermediate format that may vary between compilers. An output of the code optimization phase may be optimization of the intermediate format that uses minimal code instructions. An output of the code generation phase may be the machine code that is executed on the CPU. The output of the code generation phase may enable a user to see which instructions were picked by the compiler.

Additionally, the compiler may have different available versions and/or may have different options. The user may desire to see the output from one or more of the compilation phases in a user-friendly interface and compiled in accordance with a particular compiler version and/or option. A user may use client 102 to send a request to server 104 for information regarding one or more compilers. Server 104 may be a backend server from which the user may request an output of source code in accordance with a particular compilation phase, compiler version, and/or compiler option. In FIG. 1, server 104 includes one or more compilers and is coupled to a database 130 that stores data associated with compilers. Database 130 may store information on different compilers (e.g., versions and options) and compilation phases. Although database 130 is illustrated as being a database coupled to server 104, this is not intended to be limiting and database 130 may be a memory cache. The cache may provide for faster data lookups.

Server 104 includes a compiler version "V1.0" 132, compiler version "V2.0" 134, and compiler version "V3.0" 136. Compiler version "V1.0" 132 may be the first version of a compiler, compiler version "V2.0" 134 may be the second version of the compiler, and compiler version "V3.0" 136 may be the third version of the compiler. Compiler versions change such that compiler version "V1.0" 132 may successfully compile source code 120 to machine language while compiler version "V2.0" 134 produces warnings or errors when it compiles source code 120. Client 102 may send requests to server 104 regarding compiler version "V1.0" 132, compiler version "V2.0" 134, and/or compiler version "V3.0" 136. Although server 104 is illustrated as including three versions of a compiler, it should be understood that server 104 may include one or more versions of a compiler.

The user may select one or more features that is applied in relation to the compilation of source code 120. A feature may be, for example, a compilation phase, compiler version, or compiler option. In an example, the user only selects the compilation phase and the compiler options, but does not select the compiler version because only one compiler version is available (e.g., a default compiler version).

Client 102 sends to server 104 a communication including the user's selection 150, which may include a compilation phase, compiler version, and/or compiler options. Client 102 may also supply source code 120 to server 104 for compilation in accordance with the user's selection 150. Server 104 may send to client 102 a response including an output 152 of the compilation in accordance with the user's selection 150. Output 152 may include the actual code that is generated by the compiler. The user may invoke an application programming interface (API) (e.g., Restful API) including source code 120 at the backend system to obtain the output.

It may be desirable to provide the user with a visualization of the multi-dimensional, multi-configuration compilation process. Client 102 is coupled to a display 122 that displays objects to a user (e.g., a screen). Visualizer 110 provides a visual output of one or more compilation phases in accordance with a user's feature selections. Visualizer 110 includes a coordinate display engine 114 and object display engine 116. In an embodiment, coordinate display engine 114 displays a multi-dimensional coordinate system that provides the user with greater details on the compiler such as the compilation process and its different compilation phases, available versions of the compiler, and/or compiler options. Visualizer 110 may provide a multi-dimensional view of the compilation process so that a developer can see how a high-level programming language is transformed across different compilation phases, compiler versions, and/or different compiler options. Accordingly, visualizer 110 may provide a friendly and easy-to understand user interface representation of the compilation process.

Figure 2:
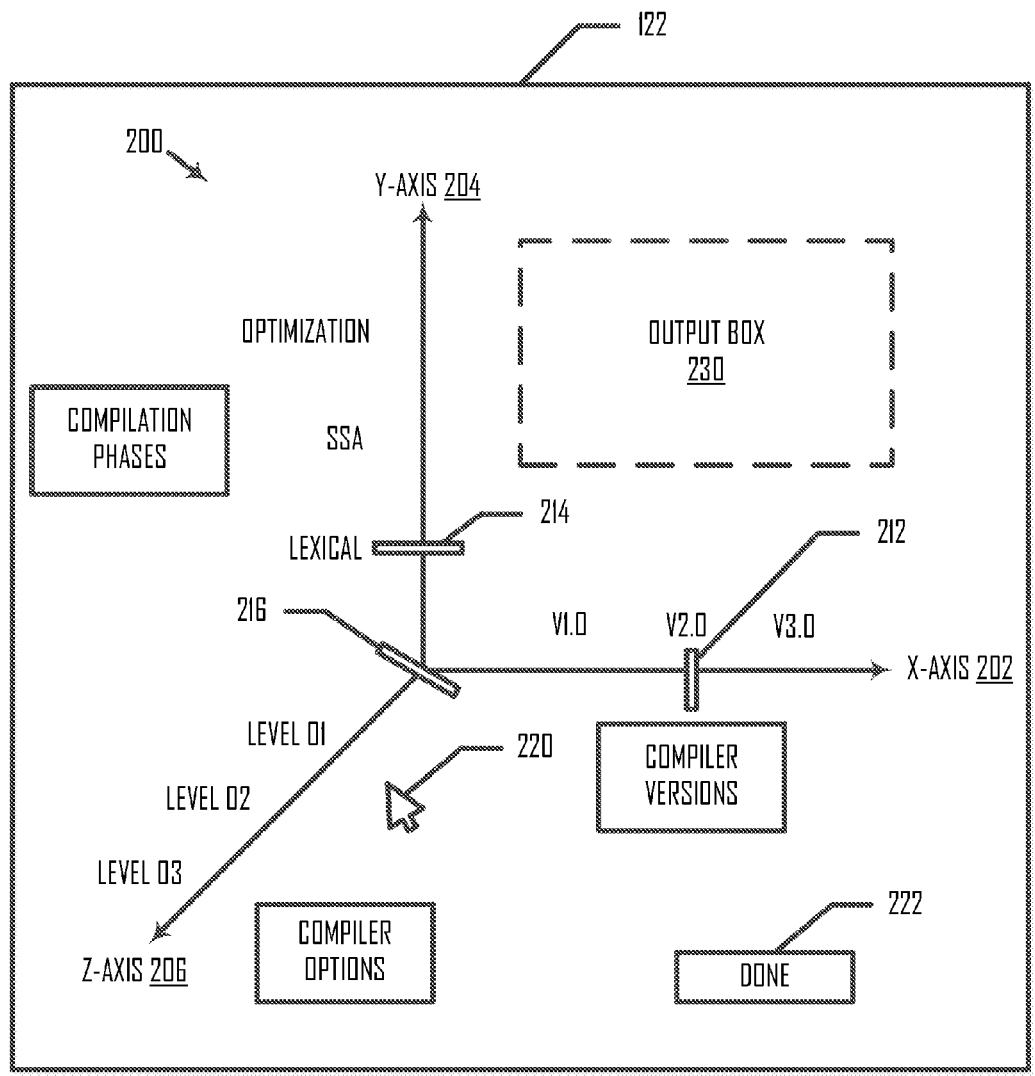
FIG. 2 is an example of a multi-dimensional coordinate system, according to an embodiment.

FIG. 2 is an example of a multi-dimensional coordinate system 200 that may be displayed via display 122, according to an embodiment. Multi-dimensional coordinate system 200 includes an x-axis 202, y-axis 204, and z-axis 206. X-axis 202 represents versions of the compiler and includes "V1.0," which corresponds to compiler version "V1.0" 132 in server 104, "V2.0," which corresponds to compiler version "V2.0" 134 in server 104, and "V3.0," which corresponds to compiler version "V3.0" 136 in server 104.

Y-axis 204 represents different compilation phases during the compilation process that transform source code 120 into machine language. Y-axis 204 includes the lexical analysis, static single assignment (SSA), and optimization phases. The lexical analysis phase may parse source code 120 to produce a stream of tokens. The SSA phase may be a property of an intermediate representation, which states that each variable is assigned exactly once. The optimization phase may optimize the output from the previous compilation phase.

Z-axis 206 represents compiler options and includes different levels of optimizations, Level O1, Level O2, and Level O3. A user interested in optimization level "Level O3" may include a mobile space developer or data center manager. A mobile space developer may want to conserve as much energy as possible to conserve energy on the mobile device, which typically does not have a consistent power supply aside from its battery. A data center manager may be interested in efficiency, conserving power, and energy consumption. Available compiler options may depend on the compilation phase selected by the user and may vary from compiler to compiler. In an example, a compiler option is used for debugging purposes or optimization purposes (e.g., Level O1, Level O2, and Level O3). A user may select optimization Level O1 for debugging purposes and may select optimization Levels O2 or O3 for code that is already in production. In another example, a compiler option is hardware specific or language specific. A user may be interested in seeing how code is represented for different hardware platforms. In another example, a compiler option triggers a specific warning.

The multi-dimensional display may enable a user to more easily grasp the compilation process and the transformation of the source code to machine language. Although multi-dimensional coordinate system 200 is described as having three axes, it should also be understood that other embodiments in which multi-dimensional coordinate system 200 has two or more axes are within the scope of the disclosure. In an example, multi-dimensional coordinate system 200 includes fewer than three axes (e.g., two axes) or more than three axes. Further, each axes may be labeled differently from that illustrated in FIG. 2. For example, another multi-dimensional coordinate system may include only an axis that represents compiler versions and another axis that represents compiler options.

In an embodiment, object display engine 116 provides one or more user interface objects associated with an axis, and the user may use the user interface object to select one or more features associated with the axis and applied in relation to the compilation of source code 120. User interface 118 may receive via the user interface object a user selection associated with the compilation process. In an example, object display engine 116 provides a user interface object 212 associated with x-axis 202, and user interface object 212 enables the user to select one or more compiler versions. In such an example, the user may use user interface object 212 to select "V1.0," "V2.0," or "V3.0." If the user selects "V1.0," client 102 may send a request to the backend server to use compiler version "V1.0" 132 to compile source code 120. Similarly, if the user selects "V2.0," client 102 may send a request to server 104 to use compiler version "V2.0" 134 to compile source code 120. Similarly, if the user selects "V3.0," client 102 may send a request to server 104 to use compiler version "V3.0" 136 to compile source code 120.

Object display engine 116 may provide a user interface object 214 associated with y-axis 204, and user interface object 214 enables the user to select one or more compilation phases. In such an example, the user may use user interface object 214 to select the lexical analysis, SSA, or optimization compilation phases. If the user selects the lexical analysis phase, client 102 may send a request to server 104 to compile source code 120 up to the lexical analysis phase and provide the output from the lexical analysis phase. Similarly, if the user selects the SSA phase, client 102 may send a request to server 104 to compile source code 120 up to the SSA phase and provide the output from the SSA phase. Similarly, if the user selects the optimization phase, client 102 may send a request to server 104 to compile source code 120 up to the optimization phase and provide the output from the optimization phase.

Object display engine 116 may provide a user interface object 216 associated with z-axis 206, and user interface object 216 enables the user to select one or more compiler options. In such an example, the user may use user interface object 216 to select optimization Levels O1, O2, or O3. The user may select different levels of optimization to see how the code is optimized.

Object display engine 116 may display user interface objects 212, 214, and 216 on display 122. In the example illustrated in FIG. 2, a user interface object is a sliding bar that intersects with its associated axis and can be moved across the axis to make a feature selection. This is not intended to be limiting, and the user interface objects may be different from a sliding bar. The user interface object may be any object that enables a user to make a selection via display 122. For example, a user interface object may be a radio button or drop-down menu. Further, the multi-dimensional coordinate system is an example and other views of the compilation process may be provided to assist the user in understanding the different compilation phases, compiler versions, and/or compiler options.

Further, although the user interface objects of FIG. 2 may be described as enabling the user to make a single selection associated with any one axis, this is not intended to be limiting and the user may be able to make more than one selection in association with any of the different groups of features. For example, the user may select multiple compiler phases if multiple radio buttons are displayed and each radio button corresponds to a compilation phase. Additionally, if the user selects the lexical analysis phase and then another compilation phase, server 104 may be able to efficiently provide two different compilation phases by compiling source code 120 up to the lexical analysis phase, save that output, and continue to compile source code 120. This may help reduce processing time and processing power because server 104 does not start from source code 120 each time, but rather leverages the fact that is just compiled source code 120 up to the lexical analysis phase and uses that output for subsequent compilation phases. Client 102 may automatically send the user's selection(s) 150 to server 104 after each axis has a selected value or may wait until the user selects a button 222 "DONE" before sending the user's selection 150 to server 104 for processing.

The user may use a variety of objects to make his or her selection. In an example, the user uses a cursor 220 to make her selection by, for example, controlling cursor 220 with a computer mouse and dragging user interface object 212 from "V2.0" to "V1.0" of x-axis 202. In such an example, client 102 may send a request to server 104 to use compiler version "V.0" 132 to compile source code 120. In another example, display 122 includes a touchscreen device, and the user uses her finger or a digital stylus to make a selection. To select compiler version "V1.0" 132, the user may place her finger on display 122 corresponding to a location on or in close proximity to user interface object 212 and drag user interface object 212 to "V1.0," which corresponds to compiler version "V1.0" 132 in server 104. In such an example, client 102 may send a request to server 104 to use compiler version "V.0" 132 to compile source code 120.

The following is a description of a user selection of the lexical analysis phase and compiler version "V2.0." This description may apply to other compilation phases and compiler versions as well as to compiler options. In FIG. 2, the user's selection 150 is the lexical analysis phase and "V2.0" of the compiler. In an example, user interface 118 receives via user interface object 214 a user selection of the lexical analysis phase and receives via user interface object 212 a user selection of compiler version "V2.0." I/O interface 112 may send over network 106 to server 104 a request including source code 120 and the user's selection 150.

Server 104 may receive the source code 120 and compile the source code 120 in accordance with the user's selection 150. For example, server 104 may use compiler version "V2.0" 134 to compile source code 120 up to the user's selected compilation phase, which in this example is the lexical analysis phase, to determine output 152. Output 152 may be included in a plain text file (e.g., JavaScript Object Notation (JSON) file). During the lexical analysis phase, a parser may parse source code 120 and produce a list of tokens defined in the programming language in which source code 120 is written. A purpose of the lexical analysis phase is to translate source code 120 to a stream of tokens. A token is a primitive unit of a programming language. Examples of tokens are reserved words, names, operators, and punctuation symbols.

Output 152 may include an output of the lexical analysis phase after compiler version "V2.0" 134 has compiled source code 120 up to the lexical analysis phase. An example output after compiler version "V2.0" 134 has compiled the source code in Table A in accordance with the lexical analysis phase is provided in Table B below.

TABLE B

```
main ( )
{
int D.1712;
int a;
int b;
int c;
a=5;
b=10;
c=0;
c=a*b;
D.1712=0;
return D.1712;
}
```

Server 104 may send output 152 to client 102 for display to the user. I/O interface 112 may obtain output 152 over network 106, and coordinate display engine 114 may display output 152 on display 122. In an example, server 104 compresses output 152 and client 102 decompresses output 152 when it is received. In an example, coordinate display engine 114 displays output 152 in an output box 230, which is between two axes of multi-dimensional coordinate system 200.

Figure 3:
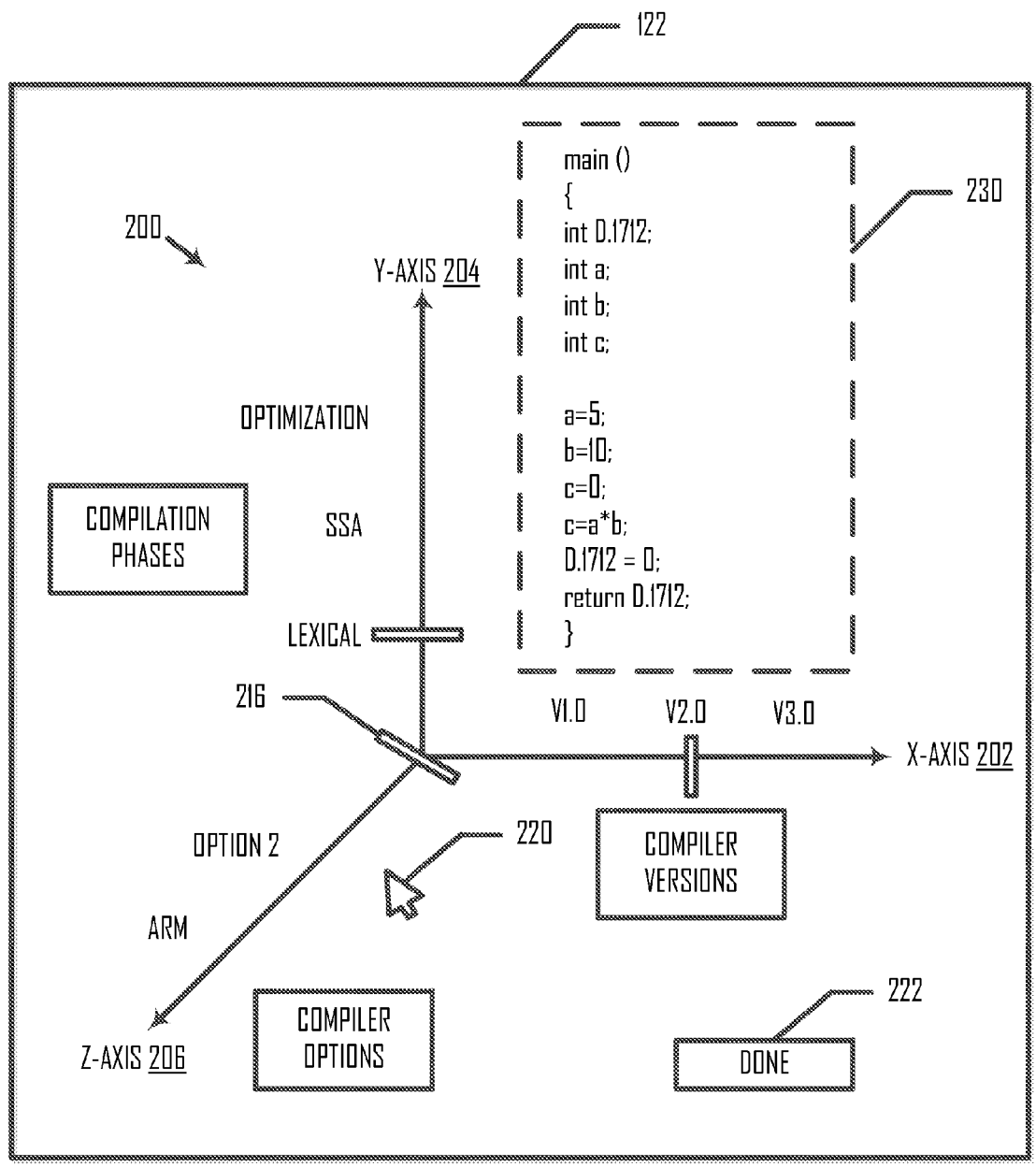
FIG. 3 is an example of a lexical analysis output, according to an embodiment.

FIG. 3 is an example of the lexical analysis output in Table B displayed in output box 230 of multi-dimensional coordinate system 200, according to an embodiment. Output box 230 may be positioned at different locations of display 122. In an example, output box 230 is positioned between y-axis 204 and z-axis 206 or between x-axis 202 and z-axis 206. In another example, output box 230 is positioned above an axis of multi-dimensional coordinate system 200. Output box 230 is positioned elsewhere on display 122. Further, a location at which output box 230 is positioned on display 122 may depend on various factors such as which features the user selected.

Coordinate display engine 114 may display one or more outputs in a way such that the user can easily understand the compilation process. For example, coordinate display engine 114 may simultaneously display two or more outputs. In such an example, coordinate display engine 114 may simultaneously display an output of the lexical analysis phase and an output of the optimization phase on display 122. Accordingly, the user may more easily compare the two outputs. In another example, coordinate display engine 114 superimposes two or more outputs. In another example, coordinate display engine 114 provides a "movie" of the outputs so that the user can see how the code is transformed between the user's selected compilation phases. Additionally, client 102 may execute a web browser that interacts with server 104. When server 104 sends the output to client 102, coordinate display engine 114 may display the output in the browser.

The user may continue to select different compilation phases, compiler versions, and/or compiler options to be provided with a visual output based on his of her selections. In an example, while the output of the lexical analysis phase is displayed, user interface 118 may receive the user's subsequent selection(s). After the output of the lexical analysis phase is displayed via display 122, the user may select another compilation phase such as the optimization phase associated with y-axis 204. In such an example, user interface 118 may receive via user interface object 214 a user selection of the optimization phase. The compiler version and/or compiler options may change or stay the same.

Client 102 may send source code 120 and a request including the appropriate user's selection(s) 150 including the optimization phase to server 104, which performs the processing and produces an output of the compilation in accordance with the user's selection(s). In keeping with the above example, server 104 sends back a response including the output of source code 120 in accordance with the selected optimization phase and compiler "V2.0." In particular, compiler version "V2.0" 134 may compile source code 120 up to the optimization phase to determine an output. I/O interface 112 may obtain the output of source code 120 compiled in accordance with the selected optimization phase and compiler version "V2.0" 134, and coordinate display engine 114 may display the output in output box 230.

An example of the output after compiler version "V2.0" 134 has compiled the source code in Table A in accordance with the optimization phase is provided in Table C below. The example output of the optimization phase in Table C may enable developers to see how efficiently the code is transformed into an intermediate representation. In the example illustrated in Table C, "<bb2>" and "<L0>" are branch labels.

TABLE C

```
main ( )
{
int c;
int b;
int a;
int D.1712;
<bb 2>;
a_1=5;
b_2=10;
c_3=0;
c_4=a_1*b_2;
D.1712_5=0;
<L0>;
return D.1712_5;
}
```

In another example, the user may select another compiler version, and user interface 118 may receive via user interface object 212 a user selection of a compiler version. For example, the user may select "V1.0" associated with x-axis 202. In such an example, user interface 118 may receive via user interface object 212 a user selection of "V1.0". The user's selection of compilation phase and/or compiler options may change or stay the same in relation to the previous user selection. Client 102 may send a request to server 104 to use compiler version "V1.0" 132 to determine an output of compiling source code 120 in accordance with the user's selection 150. Additionally, coordinate display engine 114 may display a plurality of outputs based on different compiler versions next to each other so that the user can easily compare the outputs from the two different compiler versions.

In another example, the user may select a compiler option, and user interface 118 may receive via user interface object 216 a user selection of a compiler option. For example, the user may select "Level O1" associated with z-axis 206. In such an example, user interface 118 may receive via user interface object 216 a user selection of "Level O1". The user's selection of compilation phase and/or compiler version may change or stay the same in relation to the previous user selection. Client 102 may send a request to server 104 to use compiler option "Level O1" to determine an output of compiling source code 120 in accordance with the user's selection 150. One or more compilers in server 104 may compile source code 120 in accordance with the compiler options. In an example, a compiler may compile the same source code for different optimization levels. In an example, coordinate display engine 114 displays two outputs based on compiler option "Level O1" (from the above example) and a subsequently user selected compiler option "Level O2" next to each other so that the user can easily compare the outputs from the two different compiler options. Additionally, coordinate display engine 114 may display a plurality of outputs based on different compiler options next to each other so that the user can easily compare the outputs from the two different compiler options.

As discussed above and further emphasized here, FIGS. 1-3 are merely examples, which should not unduly limit the scope of the claims. For example, although block diagram 100 is described herein with reference to server 104 including three versions of a compiler, server 104 may include one or more compilers and one or more versions for each compiler. Further, it should be understood that one or more modules (e.g., I/O interface 112, user interface 118, coordinate display engine 114, and object display engine 116) in FIG. 1 may be combined with another module. In an example, coordinate display engine 114 and object display engine 116 are combined into a single module. It should also be understood that one or more modules in FIG. 1-3 may be separated into more than one module. In an example, I/O interface 112 may be separated into a first I/O interface and a second I/O interface.

Additionally, components in FIG. 1 may reside in a machine different from that shown in FIG. 1. For example, one or more compilers included in server 104 may reside in client 102. In such an example, visualizer 110 may be a standalone application that provides source code 120 to the compilers and displays an output as described above without sending source code 120 over a network to be compiled. In another example, visualizer 110 may be included in an application that runs on a mobile device (e.g., laptop, smartphone, and tablet). Moreover, although source code 120 is described as being the input, it should be understood that any output from a compilation phase may be used as input into its subsequent compilation phase. Similarly, any output from a compilation phase may be used as input into its subsequent compilation phase. Further, server 104 may store in database 130 an output from a particular compilation phase and when a request is received for an output in accordance with a compilation phase subsequent to the particular compilation phase, server 104 may use the output from the particular compilation phase as an input to determine the output from the subsequent compilation phase. The subsequent compilation phase may be one or more compilation phases after the particular compilation phase.

III. Optimizations

A. Scaling Out to the Cloud

Further, although one server (e.g., server 104) is illustrated in FIG. 1 as producing the compilation phase output and sending it to client 102, this is not intended to be limiting and other embodiments in which more than one server is used to produce the output in accordance with the user's selection 150 and send it to client 102 may be used. In an example, I/O interface 112 may supply source code 120 to compiler version "V1.0" 132 in accordance with the user's selection 150 and may supply source code 120 to compiler version "V2.0" 134 in accordance with the user's selection 150. Compiler version "V1.0" 132 and compiler version "V2.0" 134 may reside in a common computing device or may reside in distributed computing devices.

For example, when server 104 receives a request for compilation data, the analysis may be performed on a single server (e.g., server 104) or in parallel with different virtual machines. Additionally, the analysis of the compilation data may be performed on virtual machines on the backend. By harnessing the power of cloud computing, faster performance may be provided to the user. The user may invoke an API (e.g., Restful API) to transfer the workload to multiple systems (e.g., servers or virtual machines) to speed up any operations. In an example, different APIs may be provided for different computing or storage systems.

Figure 4:
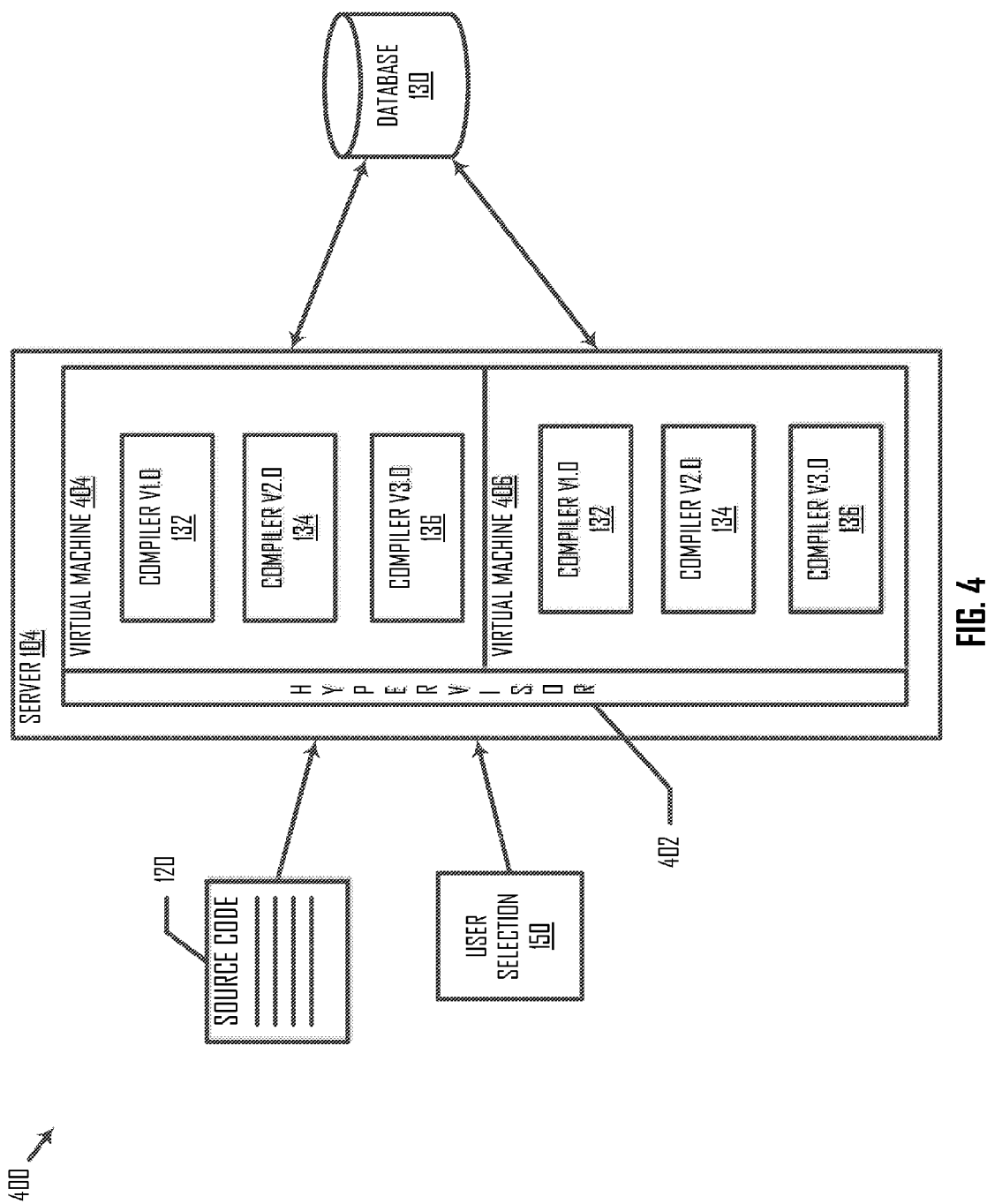
FIG. 4 is a simplified block diagram illustrating a system including virtual machines for processing portions of or all of a compilation process output, according to an embodiment.

FIG. 4 is a simplified block diagram 400 illustrating a system including virtual machines for processing portions of or all of a compilation process output, according to an embodiment. Diagram 400 includes server 104 that receives a program including source code and the user's selection 150 including one or more features (e.g., compilation phase, compiler version, and/or compiler options). Server 104 may be referred to as a host machine that hosts a set of virtual machines. Server 104 includes a hypervisor 402 that creates virtual machines 404 and 406. Virtual machine 404 includes compiler version "V1.0" 132, compiler version "V2.0" 134, and compiler version "V3.0" 136 and is coupled to database 130. Similarly, virtual machine 406 includes compiler version "V1.0" 132, compiler version "V2.0" 134, and compiler version "V3.0" 136 and is coupled to database 130. Each of the virtual machines may include more or fewer than the compiler versions illustrated in FIG. 4. Further, the virtual machines may include different compilers or compiler versions relative to each other.

When multiple compilation phases, compiler versions, and/or compiler options are specified in the user's selection 150, hypervisor 402 may start multiple virtual machines to compile the program in accordance with the different user selections. For example, if the user's selection 150 includes the lexical analysis compilation phase and compiler versions "V1.0" and "V2.0", hypervisor 402 may start virtual machine 404 to use compiler version "V1.0" 132 to compile source code 120 up to the lexical analysis phase and may start virtual machine 406 to use compiler version "V2.0" 134 to compile source code 120 up to the lexical analysis phase.

Virtual machine 404 and virtual machine 406 may execute their operations in parallel. Allowing virtual machine 404 and virtual machine 406 to execute their operations in parallel may eliminate or greatly reduce user observable wait time. Virtual machine 404 and virtual machine 406 may execute their operations in parallel when execution of an operation by virtual machine 404 and execution of an operation by virtual machine 406 has some overlap. In an example, virtual machine 404 may execute an operation on a first processor during a period of time in which virtual machine 406 executes an operation on a second processor. Each of the virtual machines may return the results to server 104, which may send the result including the appropriate compilation phase output(s) to client 102.

B. Cache Data Associated with Compilation Process

To optimize performance, server 104 may store data associated with the compilation process. For example, when server 104 receives source code 120 from a client, server 104 may store source code 120 in database 130 for later retrieval. In such an example, the client may send source code 120 to server 104, which may request that the client label source code 120 (e.g., give it a filename). Client 102 and/or server 104 may then be able to retrieve source code 120 using the label if needed later.

Database 130 may store metadata associated with one or more compilers. The metadata may include the available versions of a compiler, how many compilation phases a compiler transitions through to transform source code into machine language, and the options available for the compiler. In an embodiment, server 104 pre-computes the outputs based on one or more compilation phases, one or more compiler versions, and/or one or more compiler options that have not yet been selected by the user, and caches the output(s) or stores them in database 130. This may help reduce processing time and processing power because when client 102 sends a request for an output that has been pre-computed, it may be unnecessary for server 104 to compute the output in real-time. Rather, server 104 may retrieve the already computed output from the cache or database 130. Accordingly, server 104 may speed up the response time by pre-computing these outputs.

Server 104 may keep track of different repositories. For example, server 104 may keep track of compiler development changes made by developers and build a series of compilers with the different combination of options for every release. The individual compiler executables may be stored in database 130 or be made available in the cloud. In an example, the executables are accessed via a REST API. Further, server 104 may determine whether source code 120 has changed. If source code 120 has changed since the last cached version, server 104 may determine to compile the new source code Server 104 may compile source code 120 to object code (or past the selected compilation phase in the user's selection 150) regardless of the compilation phase actually selected by the user. Server 104 knows the compilation phases of the user's selected compiler. As such, server 104 may generate an output after each compilation phase and store it in database 130 for later retrieval. Referring to FIG. 2, after compiler version "V2.0" 134 determines the output for source code 120 in accordance with the selected lexical analysis phase, compiler version "V2.0" 134 may continue to compile source code 120 passed the selected compilation phase. For example, before receiving a user selection of the SSA or optimization phases, compiler version "V2.0" 134 may cache the output from the lexical analysis phase or store the output in database 130, and compiler version "V2.0" 134 may use that output as input into a subsequent compilation phase to determine the output from the SSA phase. Compiler version "V2.0" 134 may cache the output from the SSA phase or store the output in database 130, and compiler version "V2.0" 134 may use that output as input into a subsequent compilation phase to determine the output from the optimization phase. Responsive to receiving a request for the SSA or optimization phase in relation to compiler version "V2.0" 134, server 104 may retrieve the appropriate output from the cache or database 130.

In an example, before receiving a user selection of one or more given compiler versions, server 104 supplies source code 120 to a compiler for compilation in accordance with the not yet user selected compiler version(s). When user interface 118 receives via user interface object 212 a user selection of a compiler version, client 102 may send a request to server 104 for the output. Server 104 may determine whether an output in accordance with the user selected compiler version has been pre-computed. When server 104 determines that the output in accordance with the compiler version (along with any other appropriate criteria) has been pre-computed, server 104 may retrieve the pre-computed output from the cache or database 130 and send the output for display on display 122.

In an example, before receiving a user selection of one or more given compiler options, server 104 supplies source code 120 to a compiler for compilation in accordance with the not yet user selected compiler option(s). When user interface 118 receives via user interface object 212 a user selection of a compiler option, client 102 may send a request to server 104 for the output. Server 104 may determine whether an output in accordance with the user selected compiler option has been pre-computed. When server 104 determines that the output in accordance with the compiler option (along with any other appropriate criteria) has been pre-computed, server 104 may retrieve the pre-computed output from the cache or database 130 and send the output for display on display 122.

IV. Example Method

Figure 5:
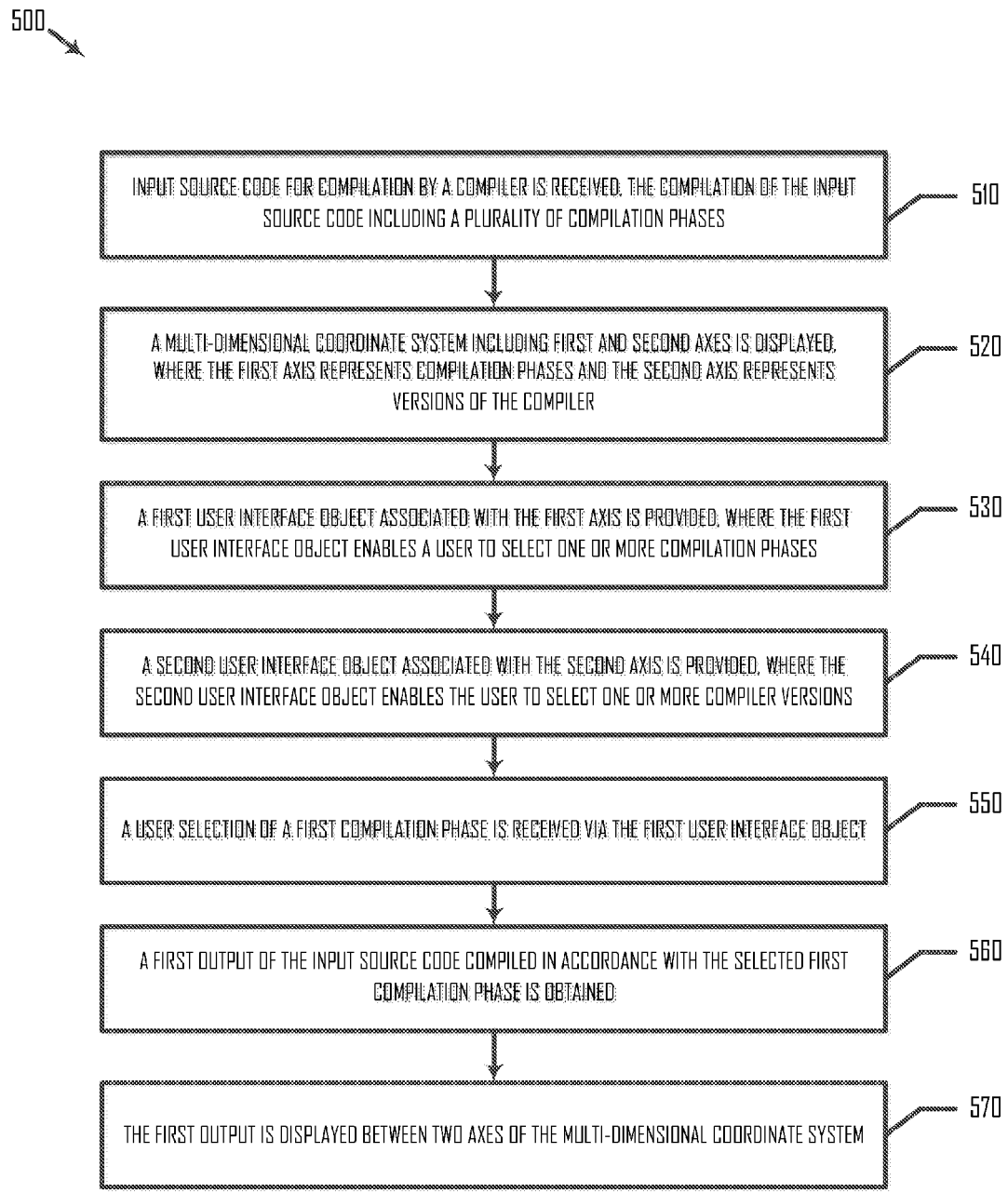
FIG. 5 is a simplified flowchart illustrating a method of providing a visual output of one or more compilation phases, according to an embodiment.

FIG. 5 is a simplified flowchart illustrating a method 500 of providing a visual output of one or more compilation phases, according to an embodiment. Method 500 is not meant to be limiting and may be used in other applications.

Method 500 includes blocks 510-570. In a block 510, input source code for compilation by a compiler is received, the compilation of the input source code including a plurality of compilation phases. In an example, I/O interface 112 receives input source code 120 for compilation by a compiler, the compilation of source code 120 including a plurality of compilation phases. In a block 520, a multi-dimensional coordinate system including first and second axes is displayed, where the first axis represents compilation phases and the second axis represents versions of the compiler. In an example, coordinate display engine 114 displays multi-dimensional coordinate system 200 including x-axis 202 and y-axis 204, where y-axis 204 represents compilation phases and x-axis 202 represents versions of the compiler.

In a block 530, a first user interface object associated with the first axis is provided, where the first user interface object enables a user to select one or more compilation phases. In an example, object display engine 116 provides user interface object 214 associated with y-axis 204, where user interface object 214 enables a user to select one or more compilation phases. In a block 540, a second user interface object associated with the second axis is provided, where the second user interface object enables the user to select one or more compiler versions. In an example, object display engine 116 provides user interface object 212 associated with x-axis 202, where user interface object 212 enables the user to select one or more compiler versions.

In a block 550, a user selection of a first compilation phase is received via the first user interface object. In an example, user interface 118 receives via user interface object 214 a user selection of a first compilation phase. In a block 560, a first output of the input source code compiled in accordance with the selected first compilation phase is obtained. In an example, I/O interface 112 obtains an output 152 of source code 120 compiled in accordance with the selected first compilation phase. In a block 570, the first output is displayed between two axes of the multi-dimensional coordinate system. In an example, coordinate display engine 114 displays the first output between two axes of the multi-dimensional coordinate system.

It is also understood that additional processes may be inserted before, during, or after blocks 510-570 discussed above. It is also understood that one or more of the blocks of method 500 described herein may be omitted, combined, or performed in a different sequence as desired.

IV. Example Computing System

Figure 6:
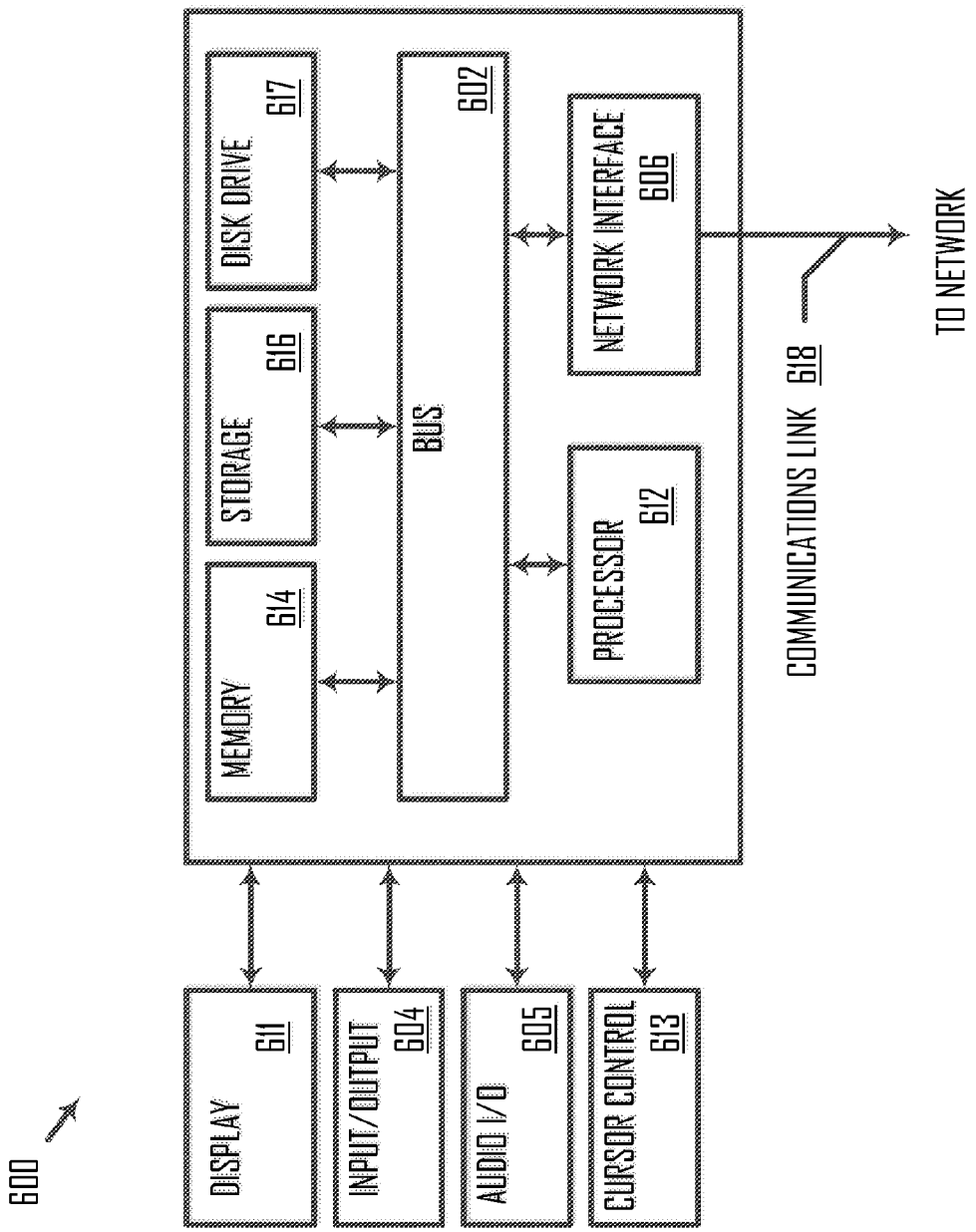
FIG. 6 is a block diagram of a computer system suitable for implementing one or more embodiments of the present disclosure.

FIG. 6 is a block diagram of a computer system 600 suitable for implementing one or more embodiments of the present disclosure. Each of coordinate display engine 114, object display engine 116, and the compilers may execute on a computing device. The computing device may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links, etc., and sends a corresponding signal to bus 602. I/O component 604 may also include an output component such as a display 611, and an input control such as a cursor control 613 (such as a keyboard, keypad, mouse, etc.). An optional audio input/output component 605 may also be included to allow a user to use voice for inputting information by converting audio signals into information signals. Audio I/O component 605 may allow the user to hear audio. A transceiver or network interface 606 transmits and receives signals between computer system 600 and other devices via a communication link 618 to a network. In an embodiment, the transmission is wireless, although other transmission mediums and methods may also be suitable. A processor 612, which may be a micro-controller, digital signal processor (DSP), or other processing component, processes these various signals, such as for display on computer system 600 or transmission to other devices via communication link 618. Processor 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor 612 and other components by executing one or more sequences of instructions contained in system memory component 614. Logic may be encoded in a computer readable medium, which may refer to any medium that participates in providing instructions to processor 612 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 614, and transmission media includes coaxial cables, copper wire, and fiber optics, including wires that include bus 602. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various blocks described herein may be changed, combined into composite blocks, and/or separated into sub-blocks to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

We claim:

1. A method of providing a visual output of one or more compilation phases, comprising:
   receiving input source code for compilation by a compiler, the compilation of the input source code including a plurality of compilation phases;
   displaying a multi-dimensional coordinate system including first and second axes, wherein the first axis represents compilation phases and the second axis represents versions of the compiler;
   providing a first user interface object associated with the first axis, wherein the first user interface object enables a user to select one or more compilation phases;
   providing a second user interface object associated with the second axis, wherein the second user interface object enables the user to select one or more compiler versions;
   receiving via the first user interface object a user selection of a first compilation phase;
   obtaining a first output of the input source code compiled in accordance with the selected first compilation phase; and
   displaying the first output between two axes of the multi-dimensional coordinate system.

2. The method of claim 1, further including:
receiving via the first user interface object a second user selection of a second compilation phase, wherein the first compilation phase is different from the second compilation phase;
obtaining a second output of the input source code compiled in accordance with the selected second compilation phase; and
displaying the second output between two axes of the multi-dimensional coordinate system.

3. The method of claim 2, further including:
before receiving the second user selection, supplying the input source code to the compiler for compilation in accordance with the second compilation phase;
storing the second output in a cache; and
responsive to receiving the second user selection, retrieving the second output from the cache.

4. The method of claim 2, wherein the receiving a second user selection includes while the first output is displayed, receiving the second user selection.

5. The method of claim 2, wherein the displaying includes simultaneously displaying the first and second outputs.

6. The method of claim 2, further including:
supplying the input source code to a first compiler for compilation in accordance with the first compilation phase.

7. The method of claim 6, further including:
supplying the input source code to a second compiler for compilation in accordance with the second compilation phase.

8. The method of claim 7, wherein the supplying includes sending the input source code over a network.

9. The method of claim 1, wherein the displaying the first output includes displaying the first output in a browser.

10. The method of claim 1, wherein the multi-dimensional coordinate system includes a third axis that represents compiler options, the method further including:
providing a third user interface object associated with the third axis, wherein the third user interface object enables the user to select one or more compiler options; and
receiving via the third user interface object a second user selection of a compiler option, wherein the obtaining a first output includes obtaining the first output of the input source code compiled in accordance with the selected compiler option.

11. The method of claim 1, wherein the first user interface object is a sliding bar that intersects with the first axis and the second user interface object is a sliding bar that intersects with the second axis.

12. The method of claim 1, further including:
receiving via the second user interface object a second user selection of a first compiler version, wherein the obtaining a first output includes obtaining the first output of the input source code compiled in accordance with the selected first compiler version.

13. The method of claim 12, further including:
before receiving a user selection of a second compiler version, supplying the input source code to a compiler for compilation in accordance with the second compiler version;
obtaining a second output of the input source code compiled in accordance with the selected first compilation phase and the second compiler version; and
storing the second output in a cache.

14. The method of claim 13, further including:
responsive to receiving a third user selection of the second compiler version, retrieving the second output from the cache; and
sending the second output for display between two axes of the multi-dimensional coordinate system.

15. A system having a processor for providing a visual output of one or more compilation phases, comprising:
a first input/output (I/O) interface that receives input source code for compilation by a compiler, wherein the compilation of the input source code includes a plurality of compilation phases;
a second I/O interface that obtains a first output of the input source code compiled in accordance with a user selected first compilation phase;
a user interface that receives via a first user interface object the user selection of the first compilation phase;
a coordinate system display engine that displays a multi-dimensional coordinate system including a first axis that represents compilation phases and a second axis that represents versions of the compiler, wherein the coordinate system display engine displays the first output between two axes of the multi-dimensional coordinate system; and
an object display engine that displays the first user interface object associated with the first axis and displays a second user interface object associated with the second axis, wherein the first user interface object enables a user to select one or more compilation phases and the second user interface object enables the user to select one or more compiler versions.

16. The system of claim 15, wherein the user interface receives via the first user interface object a second user selection of a second compilation phase that is different from the first compilation phase, wherein the I/O interface obtains a second output of the input source code compiled in accordance with the selected second compilation phase, and wherein the coordinate system display engine displays the second output between two axes of the multi-dimensional coordinate system.

17. The system of claim 16, wherein the I/O interface supplies the input source code to a first compiler for compilation in accordance with the first compilation phase and supplies the input source code to a second compiler for compilation in accordance with the second compilation phase.

18. The system of claim 17, wherein the first and second compilers reside in a common computing device.

19. The system of claim 17, wherein the first and second compilers reside in distributed computing devices.

20. A non-transitory machine-readable medium comprising a plurality of machine-readable instructions that when executed by one or more processors is adapted to cause the one or more processors to perform a method comprising:
receiving input source code for compilation by a compiler, the compilation of the input source code including a plurality of compilation phases;
displaying a multi-dimensional coordinate system including first and second axes, wherein the first axis represents compilation phases and the second axis represents versions of the compiler;
providing a first user interface object associated with the first axis, wherein the first user interface object enables a user to select one or more compilation phases;
providing a second user interface object associated with the second axis, wherein the second user interface object enables the user to select one or more compiler versions;

receiving via the first user interface object a user selection of a first compilation phase;
obtaining a first output of the input source code compiled in accordance with the selected first compilation phase; and
displaying the first output between two axes of the multi-dimensional coordinate system.

* * * * *